(12) United States Patent
Bobba et al.

(10) Patent No.: US 10,740,152 B2
(45) Date of Patent: Aug. 11, 2020

(54) TECHNOLOGIES FOR DYNAMIC ACCELERATION OF GENERAL-PURPOSE CODE USING BINARY TRANSLATION TARGETED TO HARDWARE ACCELERATORS WITH RUNTIME EXECUTION OFFLOAD

(71) Applicant: Intel Corporation, Santa Clara, CA (US)

(72) Inventors: Jayaram Bobba, Portland, OR (US); Niranjan K. Soundararajan, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 15/370,634

(22) Filed: Dec. 6, 2016

(65) Prior Publication Data

US 2018/0157531 A1    Jun. 7, 2018

(51) Int. Cl.
*G06F 9/50*    (2006.01)
(52) U.S. Cl.
CPC ...... *G06F 9/5044* (2013.01); *G06F 2209/509* (2013.01); *Y02D 10/22* (2018.01)
(58) Field of Classification Search
CPC ............... G06F 9/5011; G06F 9/4881; G06F 2209/509; G06F 2209/501; G06F 9/4887;
(Continued)

(56) References Cited

U.S. PATENT DOCUMENTS 7,925,863 B2 *    4/2011    Hundley ............... G06F 9/4843
                                                       712/34
9,575,723 B2 *    2/2017    Sofia ..................... G06F 9/4843
(Continued)

OTHER PUBLICATIONS

PCjs Machines; Article Q38285: Detecting Presence of 80×87 Math Coprocessor [online], Nov. 30, 1988 [retrieved on May 14, 2018]. Retrieved from the Internet: <URL: https://www.pcjs.org/pubs/pc/reference/microsoft/kb/Q38285/>.*

*Primary Examiner* — Meng Ai T An
*Assistant Examiner* — Zujia Xu
(74) *Attorney, Agent, or Firm* — Barnes & Thornburg LLP (57) ABSTRACT

Technologies for dynamic acceleration of general-purpose code include a computing device having a general-purpose processor core and one or more hardware accelerators. The computing device identifies an acceleration candidate in an application that is targeted to the processor core. The acceleration candidate may be a long-running computation of the application. The computing device translates the acceleration candidate into a translated executable targeted to the hardware accelerator. The computing device determines whether to offload execution of the acceleration candidate and, if so, executes the translated executable with the hardware accelerator. The computing device may translate the acceleration candidate into multiple translated executables, each targeted to a different hardware accelerator. The computing device may select among the translated executables in response to determining to offload execution. The hardware accelerators may include, for example, a processor graphics, an image signal processor, or a field-programmable gate array. Other embodiments are described and claimed.

17 Claims, 2 Drawing Sheets

(58) Field of Classification Search
CPC .... G06F 9/262; G06F 9/30065; G06F 9/4482; G06F 9/4406; G06F 9/45516
See application file for complete search history.

(56) References Cited

U.S. PATENT DOCUMENTS

| | | | | |
|---|---|---|---|---|
| 2004/0088690 | A1* | 5/2004 | Shaul | G06F 9/45516 717/154 |
| 2004/0257370 | A1* | 12/2004 | Lippincott | G06F 9/3879 345/502 |
| 2006/0077896 | A1* | 4/2006 | Chadha | H04L 47/10 370/235 |
| 2007/0169057 | A1* | 7/2007 | Silvera | G06F 8/4452 717/160 |
| 2008/0244241 | A1* | 10/2008 | Barraclough | G06F 8/52 712/222 |
| 2009/0270138 | A1* | 10/2009 | Raveendran | H04N 21/443 455/574 |
| 2010/0205606 | A1* | 8/2010 | Panzer | G06F 9/4484 718/102 |
| 2013/0061033 | A1* | 3/2013 | Kim | G06F 15/7842 713/100 |
| 2013/0080805 | A1* | 3/2013 | Vick | G06F 8/4432 713/320 |
| 2014/0189312 | A1* | 7/2014 | Tan | G06F 9/3017 712/214 |
| 2014/0215453 | A1* | 7/2014 | Peng | G06F 8/61 717/174 |
| 2014/0232938 | A1* | 8/2014 | Mody | H04N 21/234309 348/469 |
| 2014/0310709 | A1* | 10/2014 | Nirantar | G06F 9/5027 718/1 |
| 2016/0012107 | A1* | 1/2016 | Asaad | G06F 16/24569 707/764 |
| 2017/0177404 | A1* | 6/2017 | Drysdale | G06F 9/466 |

* cited by examiner

TECHNOLOGIES FOR DYNAMIC ACCELERATION OF GENERAL-PURPOSE CODE USING BINARY TRANSLATION TARGETED TO HARDWARE ACCELERATORS WITH RUNTIME EXECUTION OFFLOAD

BACKGROUND

Typical computing devices include general-purpose processor cores as well as programmable hardware accelerators such as graphics processing units, media processing cores, image processing engines, field-programmable gate arrays (FPGAs), and/or other specialized hardware devices. Programmable hardware accelerators may provide improved performance and/or power consumption for certain classes of computations. Programmable hardware accelerators are typically exposed to applications through heterogeneous programming language/runtimes such as OpenCL™ and RenderScript or through well-defined APIs such as OpenMAX™. However, most applications are programmed to target general-purpose processor cores and must be manually re-written to target a particular hardware accelerator.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
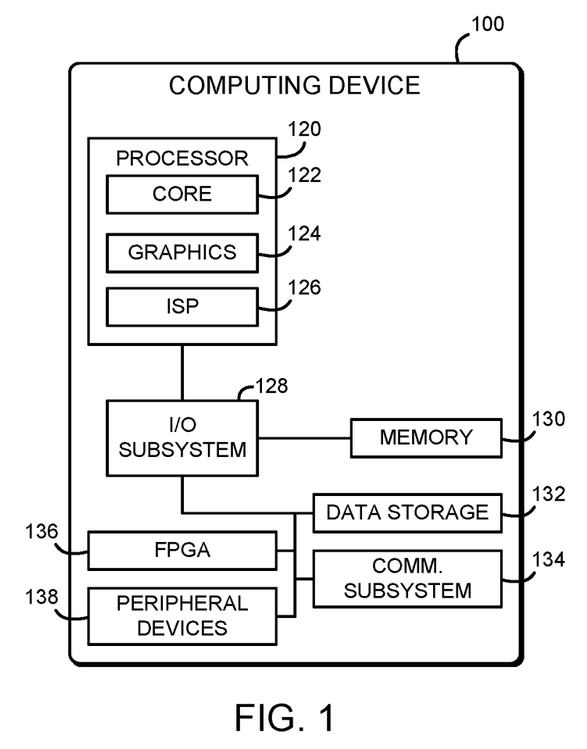
FIG. 1 is a simplified block diagram of at least one embodiment of a computing device for dynamic acceleration of general-purpose code.

Referring now to FIG. 1, an illustrative computing device 100 for dynamic code acceleration includes a processor 120 that includes one or more general-purpose processor cores 122 as well as one or more programmable hardware accelerators. In use, as described below, the computing device 100 executes an application using a general-purpose processor core 122. The computing device 100 identifies one or more acceleration candidates within the application. The acceleration candidates may be embodied as, for example, long-running computations that are amenable to acceleration. The computing device 100 translates the acceleration candidates into corresponding translated executables that are each targeted to a particular hardware accelerator. At runtime, the computing device 100 may dynamically determine whether to offload processing of an acceleration candidate to a hardware accelerator and then execute the translated executable with the targeted hardware accelerator. The computing device 100 may also dynamically select a particular hardware accelerator for offload. Thus, the computing device 100 may provide improved performance and/or power efficiency for general-purpose software, without requiring software developers to manually target particular hardware accelerators. Additionally, the computing device 100 may improve performance and/or power efficiency for legacy applications that have not been updated to take advantage of available hardware accelerators.

The processor 120 may be embodied as any type of processor capable of performing the functions described herein. For example, the processor 120 may be embodied as a single or multi-core processor(s), digital signal processor, microcontroller, or other processor or processing/controlling circuit. The illustrative processor 120 is a single-core processor 120 having one processor core 122. Each processor core 122 is an independent, general-purpose processing unit capable of executing programmed instructions. In particular, the processor core 122 executes instructions from a general-purpose instruction set architecture (ISA) such as IA-32 or Intel® 64. It should be understood that in other embodiments the processor 120 may be embodied as a multi-core or multi-threaded processor, digital signal processor, microcontroller, or other processor or processing/controlling circuit with multiple processor cores or other independent processing units.

As shown, the processor 120 further includes a processor graphics 124 and an image signal processor 126. The processor graphics 124 may be embodied as any processor graphics, graphics processing unit (GPU), or other circuit or collection of circuits capable of rendering two-dimensional and/or three-dimensional graphics. The processor graphics 124 may also include media processing circuitry, such as accelerated video decoding circuitry and/or accelerated video encoding circuitry. Although illustrated as separate functional blocks, it should be understood that in some embodiments the functionality of the processor graphics 124 may be incorporated in one or more other components of the computing device 100, such as the processor 120, the processor core 122, and/or the I/O subsystem 128. Similarly, the image signal processor 126 may be embodied as any media processor, co-processor, functional block, or other circuit or collection of circuits capable of performing accelerated processing of two-dimensional and/or three-dimensional images, for example images captured using a digital camera of the computing device 100.

The memory 130 may be embodied as any type of volatile or non-volatile memory or data storage capable of performing the functions described herein. In operation, the memory 130 may store various data and software used during operation of the computing device 100 such operating systems, applications, programs, libraries, and drivers. The memory 130 is communicatively coupled to the processor 120 via the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, sensor hubs, firmware devices, communication links (i.e., point-to-point links, bus links, wires, cables, light guides, printed circuit hoard traces, etc.) and/or other components and subsystems to facilitate the input/output operations. In some embodiments, the I/O subsystem 128 may form a portion of a system-on-a-chip (SoC) and be incorporated, along with the processor 120, the memory 130, and other components of the computing device 100, on a single integrated circuit chip.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, InfiniBand®, Bluetooth®, WiMAX, 3G, 4G LTE, etc.) to effect such communication.

As shown in FIG. 1, the computing device 100 may include a field-programmable gate array (FPGA) 136. The FPGA 136 may be embodied as an integrated circuit including programmable digital logic resources that may be configured after manufacture. The FPGA 136 may include, for example, a configurable array of logic blocks in communication over a configurable data interchange. The FPGA 136 may be coupled to the processor 120 via a peripheral bus such as a PCI express bus, via an inter-processor interconnect such as an in-die interconnect (IDI) or QuickPath Interconnect (QPI), or via any other appropriate interconnect. Although illustrated in FIG. 1 as a discrete component separate from the processor 120 and/or the I/O subsystem 128, it should be understood that in some embodiments one or more of the FPGA 136, the processor 120, the I/O subsystem 128, and/or the memory 130 may be incorporated in the same package and/or in the same computer chip, for example in the same SoC.

The computing device 100 may further include one or more peripheral devices 138. The peripheral devices 138 may include any number of additional input/output devices, interface devices, hardware accelerators, and/or other peripheral devices. For example, in some embodiments, the peripheral devices 138 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices. Thus, although illustrated as including the processor graphics 124, the image signal processor 126, and the FPGA 136, it should be understood that in some embodiments the computing device 100 may include one or more additional or otherwise different hardware accelerators.

Figure 2:
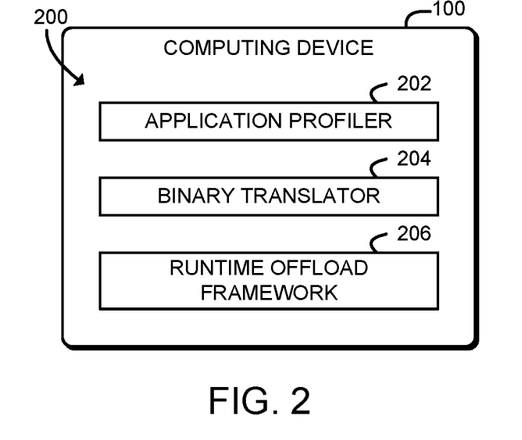
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes an application profiler 202, a binary translator 204, and a runtime offload framework 206. The various components of the environment 200 may be embodied as hardware, firmware, software, or a combination thereof. As such, in some embodiments, one or more of the components of the environment 200 may be embodied as circuitry or collection of electrical devices (e.g., application profiler circuitry 202, binary translator circuitry 204, and/or runtime offload circuitry 206). It should be appreciated that, in such embodiments, one or more of the application profiler circuitry 202, the binary translator circuitry 204, and/or the runtime offload circuitry 206 may form a portion of the processor 120, the I/O subsystem 128, and/or other components of the computing device 100. Additionally, in some embodiments, one or more of the illustrative components may form a portion of another component and/or one or more of the illustrative components may be independent of one another.

The application profiler 202 is configured to identify an acceleration candidate in an application executable. The application executable is targeted to an instruction set architecture of the processor core 122. The acceleration candidate may be embodied as, for example, a long-running computation of the application executable and may be identified using statistical performance analysis to identify frequently executed instructions of the application executable and/or by instrumenting the application executable.

The binary translator 204 is configured to translate the acceleration candidate into a one or more translated executables. Each translated executable is targeted to an instruction set architecture of a corresponding hardware accelerator of the computing device 100. The hardware accelerators may include, for example, the processor graphics 124, the image signal processor 126, and/or the FPGA 136.

The runtime offload framework 206 is configured to determine whether to offload execution of an acceleration candidate and then execute the corresponding translated executable with the associated hardware accelerator. The runtime offload framework 206 may be further configured to select the translated executable from multiple available translated executables in response to the determining to offload execution of the acceleration candidate. In some embodiments, the runtime offload framework 206 may be configured to copy input data associated with the acceleration candidate to the hardware accelerator in response to determining to offload execution of the acceleration candidate and to copy output data associated with the translated executable to the processor core 122 in response to executing the translated executable.

Figure 3:
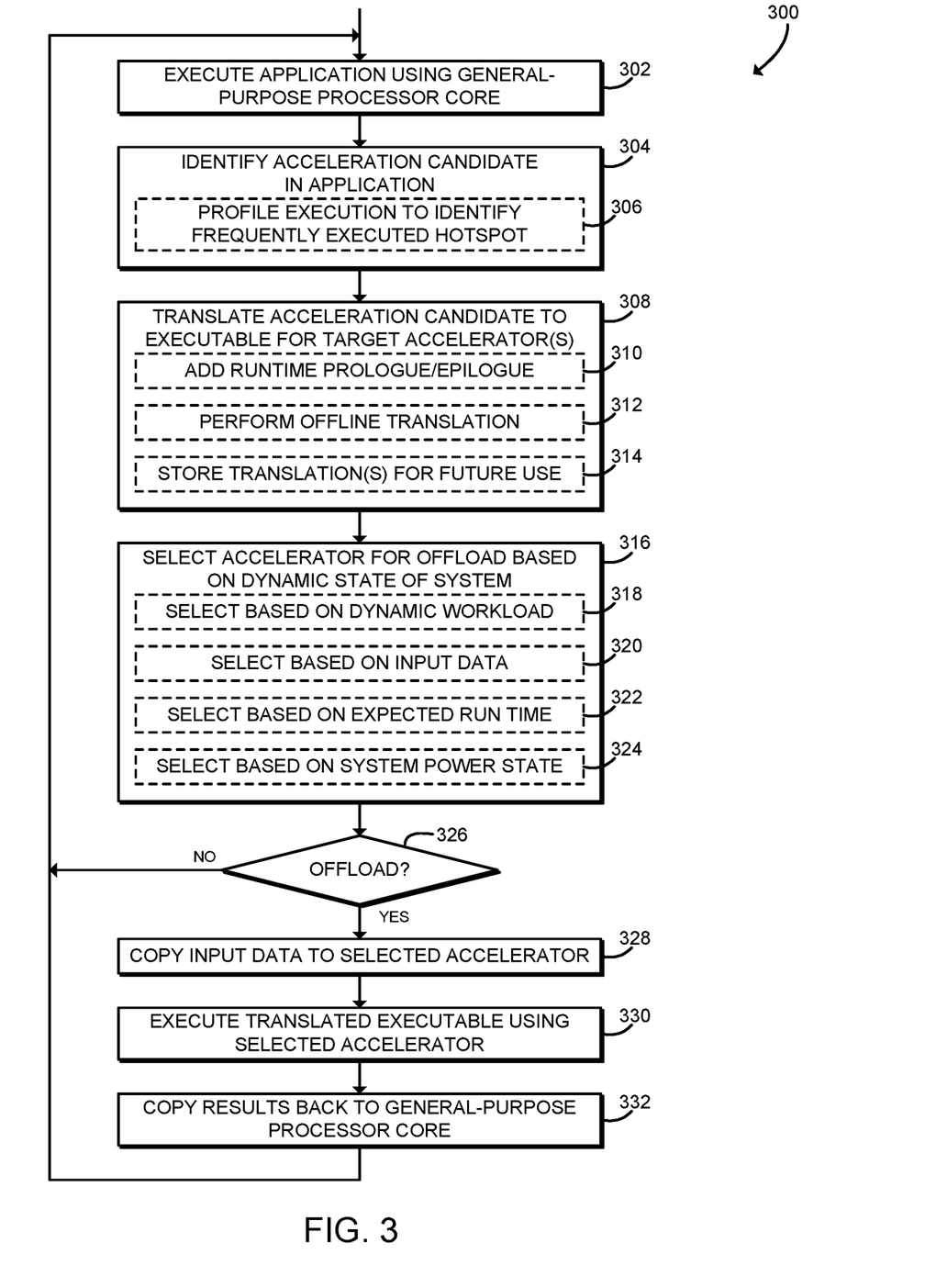
FIG. 3 is a simplified flow diagram of at least one embodiment of a method for dynamic acceleration of general-purpose code that may be executed by the computing device of FIGS. 1 and 2.

Referring now to FIG. 3, in use, the computing device 100 may execute a method 300 for dynamic acceleration of general-purpose code. It should be appreciated that, in some embodiments, the operations of the method 300 may be performed by one or more components of the environment 200 of the computing device 100 as shown in FIG. 2. The method 300 begins in block 302, in which the computing device 100 executes an application using a general-purpose processor core 122 of the processor 120. The application may be embodied as any user-facing application, system application, process, thread, or other computer program executed by the computing device 100. In particular, the application may be embodied as binary code targeted to an instruction set architecture (ISA) of the processor core 122. In some embodiments, the application may be embodied as bytecode, intermediate code, virtual machine code, or other code that is compiled to native code and executed by the processor core 122.

In block 304, the computing device 100 identifies an acceleration candidate in the application. The application candidate may be embodied as any function, subroutine, computation, or other segment of the application that, if executed by a hardware accelerator, may improve application performance and/or power consumption. In some embodiments, in block 306, the computing device 100 may profile execution of the application to identify a frequently executed hotspot as the acceleration candidate. The hotspot may represent long-running code that takes up a significant portion of the execution time of the application. The computing device 100 may use any appropriate technique to identify the hotspot. For example, the computing device 100 may use statistical sampling to identify frequently executed instructions. The computing device 100 may use hardware counters and statistical sampling techniques to identify frequently executed instructions. The computing device 100 may then instrument the code segments including those frequently executed instructions using binary instrumentation to capture execution behavior of the associated computations. The computing device 100 may then determine whether the computation is amenable to hardware acceleration, for example using various accelerator-specific heuristics. For example, the computing device 100 may determine that a computation that applies filters to an image may be accelerated using the image signal processor 126. As another example, the computing device 100 may determine that certain types of massively parallel computations may be accelerated using the FPGA 136 and/or the processor graphics 124. If amenable to acceleration, the computing device 100 may identify the computation as an acceleration candidate.

In block 308, the computing device 100 translates the acceleration candidate into one or more translated executables that are each targeted to a hardware accelerator. For example, the acceleration candidate may be translated to target the instruction set architecture of the processor graphics 124, the image signal processor 126, the FPGA 136, and/or other hardware accelerators of the computing device 100. In some embodiments, the acceleration candidate may be translated to target a specialized instructions set extension or other instructions of the processor core 122, for example to target vector instructions, cryptographic extensions, or other instructions. In some embodiments, the computing device 100 may seek explicit permission from a user before translating the acceleration candidate and/or may use whitelists to permit certain predefined applications to be accelerated.

To perform the binary translation, the computing device 100 may identify inputs to the acceleration candidate. The inputs may include all of the registers that are live-in as well as the memory locations read by various load instructions in the acceleration candidate. The addresses of the load instructions may be statically definable in terms of the input registers. The computing device 100 also identifies output of the acceleration candidate, which includes the registers that are live-out and the memory modified by store instructions. The addresses of the store instructions may be statically definable in terms of the input registers.

In block embodiments, in block 310 the computing device 100 may add a runtime prologue and/or epilogue to the translated executable. The prologue may, for example, copy input data from the processor core 122 (e.g., from registers and/or the memory 130) to the hardware accelerator, and the epilogue may copy output data from the hardware accelerator back to the processor core 122. In some embodiments, in block 312 the computing device 100 may perform an offline translation of the acceleration candidate. The computing device 100 may, for example, translate the acceleration candidate at a time when the computing device 100 is not being used interactively. As another example, in some embodiments, the computing device 100 may determine whether to translate the acceleration candidate based on the power state of the computing device 100, for example performing translation only when the computing device 100 is plugged in to a power supply to reduce impact on battery life. In some embodiments, in block 314, the computing device 100 may cache or otherwise store the translated executable for future use, which may improve performance.

As described above, the same acceleration candidate may be translated into multiple translated executables that each targets a different hardware accelerator. In block 316, the computing device 100 selects a hardware accelerator to offload the computation based on the dynamic state of the computing device 100. Of course, in certain circumstances the computing device 100 may determine not to offload a particular acceleration candidate (i.e., determine to execute the acceleration candidate with the processor core 122). The computing device 100 may use one or more heuristic tests to identify the best hardware accelerator to perform the computation. Heuristic data used to select the hardware accelerator may also be stored by the computing device 100 for future use. In some embodiments, in block 318 the computing device 100 may select the hardware accelerator based on the dynamic workload of the computing device 100. For example, the computing device 100 may select a hardware accelerator that is not busy or use other selection criteria based on workload. As a particular example, in response to determining that the processor graphics 124 is currently busy, the computing device 100 may select the image signal processor 126 for offload or, in some embodiments, may execute the acceleration candidate with the processor core 122. In some embodiments, in block 320 the computing device 100 may select the hardware accelerator based on the input data to the acceleration candidate. For example, the computing device 100 may select the appropriate hardware accelerator based on the size of the input data. In some embodiments, in block 322 the computing device 100 may select the hardware accelerator based on the expected run time of acceleration candidate on each hardware accelerator. The expected run time may be determined, for example, based on prior measurements of execution or on an analytical model. In some embodiments, in block 324 the computing device 100 may select the hardware accelerator based on the system power state of the computing device 100. For example, the computing device 100 may be biased to prefer performance or power efficiency based on the battery state of the computing device 100.

In block 326, the computing device 100 determines whether to offload the acceleration candidate to the selected hardware accelerator. The computing device 100 may determine, for example, whether one or more translated executables exist for the acceleration candidate and whether a hardware accelerator has been selected for offload. If the computing device 100 determines not to offload the acceleration candidate, the method 300 loops back to block 302 to continue executing the application with the processor core 122. If the computing device 100 determines to offload the acceleration candidate, the method 300 advances to block 328.

In block 328, the computing device 100 copies input data for the acceleration candidate to the hardware accelerator. The computing device 100 may, for example, execute a prologue with the processor core 122 and/or the hardware accelerator to copy the data. The particular technique used to copy the input data may depend on the selected hardware accelerator. The computing device 100 may use memory page protection mechanisms of the processor core 122 to protect the input data from being overwritten by other simultaneously executing threads. In some embodiments, the prologue may perform disambiguation checks to ensure that the output of the acceleration candidate does not overlap with the input data in ways that could cause the translation to be incorrect.

In block 330, after the input data is transferred, the computing device 100 executes the translated executable for the acceleration candidate using the selected hardware accelerator. For example, the computing device 100 may execute the translated executable using the processor graphics 124, the image signal processor 126, the FPGA 136, or other hardware accelerator of the computing device 100.

In block 332, the computing device 100 copies output data from the hardware accelerator back to the processor core 122. The computing device 100 may, for example, execute an epilogue with the processor core 122 and/or the hardware accelerator to copy the output data to the main memory 130. The particular technique used to copy the output data may depend on the selected hardware accelerator. After copying the output data back to the processor core 122, the method 300 loops back to block 302 to continue executing the application using the general purpose processor core 122. The processor core 122 may resume execution, for example, with the instruction of the application executable that follows the acceleration candidate dial was offloaded.

It should be appreciated that, in some embodiments, the method 300 may be embodied as various instructions stored on a computer-readable media, which may be executed by the processor 120 and/or other components of the computing device 100 to cause the computing device 100 to perform the method 300. The computer-readable media may be embodied as any type of media capable of being read by the computing device 100 including, but not limited to, the memory 130, the data storage device 132, firmware devices, other memory or data storage devices of the computing device 100, portable media readable by a peripheral device 138 of the computing device 100, and/or other media.

EXAMPLES

Illustrative examples of the technologies disclosed herein are provided below. An embodiment of the technologies may include any one or more, and any combination of, the examples described below.

Example 1 includes a computing device for dynamic code acceleration, the computing device comprising: a processor core; a first hardware accelerator; an application profiler to identify an acceleration candidate in an application executable, wherein the application executable is targeted to an instruction set architecture of the processor core; a binary translator translate the acceleration candidate into a first translated executable, wherein the first translated executable is targeted to an instruction set architecture of the first hardware accelerator; and a runtime offload framework to: (i) determine whether to offload execution of the acceleration candidate and (ii) execute the first translated executable with the first hardware accelerator in response to a determination to offload execution of the acceleration candidate.

Example 2 includes the subject matter of Example 1, and wherein: the runtime offload framework is further to: (i) copy input data associated with the acceleration candidate to the hardware accelerator in response to the determination to offload execution of the acceleration candidate, and (ii) copy output data associated with the first translated executable to the processor core in response to execution of the first translated executable; and to execute the first translated executable further comprises to execute the first translated executable in response to copying of the input data.

Example 3 includes the subject matter of any of Examples 1 and 2, and wherein: to translate the acceleration candidate comprises to generate a prologue and an epilogue; to copy the input data associated with the acceleration candidate comprises to execute the prologue; and to copy the output data associated with the first translated executable comprises to execute the epilogue.

Example 4 includes the subject matter of any of Examples 1-3, and wherein to execute the epilogue comprises to execute the epilogue by the processor core.

Example 5 includes the subject matter of any of Examples 1-4, and wherein to execute the epilogue comprises to execute the epilogue by the first hardware accelerator.

Example 6 includes the subject matter of any of Examples 1-5, and wherein to identify the acceleration candidate comprises to identify a long-running computation of the application executable.

Example 7 includes the subject matter of any of Examples 1-6, and wherein to identify the long-running computation comprises to statistically identify frequently executed instructions of the application executable.

Example 8 includes the subject matter of any of Examples 1-7, and wherein to identify the long-running computation comprises to instrument the application executable.

Example 9 includes the subject matter of any of Examples 1-8, and further comprising a second hardware accelerator, wherein: the binary translator is further to translate the acceleration candidate into a second translated executable, wherein the second translated executable is targeted to an instruction set architecture of the second hardware accelerator; the runtime offload framework is further to select the first translated executable in response to the determination to offload execution of the acceleration candidate; and to execute the first translated executable comprises to execute the first translated executable in response to selection of the first translated executable.

Example 10 includes the subject matter of any of Examples 1-9, and wherein to select the first translated executable comprises to select the first translated executable based on a dynamic workload of the computing device.

Example 11 includes the subject matter of any of Examples 1-10, and wherein to select the first translated executable comprises to select the first translated executable based on input data associated with the acceleration candidate.

Example 12 includes the subject matter of any of Examples 1-11, and wherein to select the first translated executable comprises to select the first translated executable based on an expected runtime of the first translated executable.

Example 13 includes the subject matter of any of Examples 1-12, and wherein to select the first translated executable comprises to select the first translated executable based on a power state of the computing device.

Example 14 includes the subject matter of any of Examples 1-13, and wherein the first hardware accelerator comprises a processor graphics of the computing device.

Example 15 includes the subject matter of any of Examples 1-14, and wherein the first hardware accelerator comprises an image signal processor of the computing device.

Example 16 includes the subject matter of any of Examples 1-15, and wherein the first hardware accelerator comprises a field-programmable gate array of the computing device.

Example 17 includes a method for dynamic code acceleration, the method comprising: identifying, by a computing device, an acceleration candidate in an application executable, wherein the application executable is targeted to an instruction set architecture of a processor core of the computing device; translating, by the computing device, the acceleration candidate into a first translated executable, wherein the first translated executable is targeted to an instruction set architecture of a first hardware accelerator of the computing device; determining, by the computing device, whether to offload execution of the acceleration candidate; and executing, by the computing device, the first translated executable with the first hardware accelerator in response to determining to offload execution of the acceleration candidate.

Example 18 includes the subject matter of Example 17, and further comprising: copying, by the computing device, input data associated with the acceleration candidate to the hardware accelerator in response to determining to offload execution of the acceleration candidate; and copying, by the computing device, output data associated with the first translated executable to the processor core in response to executing the first translated executable; wherein executing the first translated executable further comprises executing the first translated executable in response to copying the input data.

Example 19 includes the subject matter of any of Examples 17 and 18, and wherein: translating the acceleration candidate comprises generating a prologue and an epilogue; copying the input data associated with the acceleration candidate comprises executing the prologue; and copying the output data associated with the first translated executable comprises executing the epilogue.

Example 20 includes the subject matter of any of Examples 17-19, and wherein executing the epilogue comprises executing the epilogue by the processor core.

Example 21 includes the subject matter of any of Examples 17-20, and wherein executing the epilogue comprises executing the epilogue by the first hardware accelerator.

Example 22 includes the subject matter of any of Examples 17-21, and wherein identifying the acceleration candidate comprises identifying a long-running computation of the application executable.

Example 23 includes the subject matter of any of Examples 17-22, and wherein identifying the long-running computation comprises statistically identifying frequently executed instructions of the application executable.

Example 24 includes the subject matter of any of Examples 17-23, and wherein identifying the long-running computation comprises instrumenting the application executable.

Example 25 includes the subject matter of any of Examples 17-24, and further comprising: translating, by the computing device, the acceleration candidate into a second translated executable, wherein the second translated executable is targeted to an instruction set architecture of a second hardware accelerator of the computing device; and selecting, by the computing device, the first translated executable in response to determining to offload execution of the acceleration candidate; wherein executing the first translated executable comprises executing the first translated executable in response to selecting the first translated executable.

Example 26 includes the subject matter of any of Examples 17-25, and wherein selecting the first translated executable comprises selecting the first translated executable based on a dynamic workload of the computing device.

Example 27 includes the subject matter of any of Examples 17-26, and wherein selecting the first translated executable comprises selecting the first translated executable based on input data associated with the acceleration candidate.

Example 28 includes the subject matter of any of Examples 17-27, and wherein selecting the first translated executable comprises selecting the first translated executable based on an expected runtime of the first translated executable.

Example 29 includes the subject matter of any of Examples 17-28, and wherein selecting the first translated executable comprises selecting the first translated executable based on a power state of the computing device.

Example 30 includes the subject matter of any of Examples 17-29, and wherein the first hardware accelerator comprises a processor graphics of the computing device.

Example 31 includes the subject matter of any of Examples 17-30, and wherein the first hardware accelerator comprises an image signal processor of the computing device.

Example 32 includes the subject matter of any of Examples 17-31, and wherein the first hardware accelerator comprises a field-programmable gate array of the computing device.

Example 33 includes a computing device comprising: a processor; and a memory having stored therein a plurality of instructions that when executed by the processor cause the computing device to perform the method of any of Examples 17-32.

Example 34 includes one or more machine readable storage media comprising a plurality of instructions stored thereon that in response to being executed result in a computing device performing the method of any of Examples 17-32.

Example 35 includes a computing device comprising means for performing the method of any of Examples 17-32.

Example 36 includes a computing device for dynamic code acceleration, the computing device comprising: means for identifying an acceleration candidate in an application executable, wherein the application executable is targeted to an instruction set architecture of a processor core of the computing device; means for translating the acceleration candidate into a first translated executable, wherein the first translated executable is targeted to an instruction set architecture of a first hardware accelerator of the computing device; means for determining whether to offload execution of the acceleration candidate; and means for executing the first translated executable with the first hardware accelerator in response to determining to offload execution of the acceleration candidate.

Example 37 includes the subject matter of Example 36, and further comprising: means for copying input data associated with the acceleration candidate to the hardware accelerator in response to determining to offload execution of the acceleration candidate; and means for copying output data associated with the first translated executable to the processor core in response to executing the first translated executable; wherein the means for executing the first translated executable further comprises means for executing the first translated executable in response to copying the input data.

Example 38 includes the subject matter of any of Examples 36 and 37, and wherein: the means for translating the acceleration candidate comprises means for generating a prologue and an epilogue; the means for copying the input data associated with the acceleration candidate comprises means for executing the prologue; and the means for copying the output data associated with the first translated executable comprises means for executing the epilogue.

Example 39 includes the subject matter of any of Examples 36-38, and wherein the means for executing the epilogue comprises means for executing the epilogue by the processor core.

Example 40 includes the subject matter of any of Examples 36-39, and wherein the means for executing the epilogue comprises means for executing the epilogue by the first hardware accelerator.

Example 41 includes the subject matter of any of Examples 36-40, and wherein the means for identifying the acceleration candidate comprises means for identifying a long-running computation of the application executable.

Example 42 includes the subject matter of any of Examples 36-41, and wherein the means for identifying the long-running computation comprises means for statistically identifying frequently executed instructions of the application executable.

Example 43 includes the subject matter of any of Examples 36-42, and wherein the means for identifying the long-running computation comprises means for instrumenting the application executable.

Example 44 includes the subject matter of any of Examples 36-43, and further comprising: means for translating the acceleration candidate into a second translated executable, wherein the second translated executable is targeted to an instruction set architecture of a second hardware accelerator of the computing device; and means for selecting the first translated executable in response to determining to offload execution of the acceleration candidate; wherein the means for executing the first translated executable comprises means for executing the first translated executable in response to selecting the first translated executable.

Example 45 includes the subject matter of any of Examples 36-44, and wherein the means for selecting the first translated executable comprises means for selecting the first translated executable based on a dynamic workload of the computing device.

Example 46 includes the subject matter of any of Examples 36-45, and wherein the means for selecting the first translated executable comprises means for selecting the first translated executable based on input data associated with the acceleration candidate.

Example 47 includes the subject matter of any of Examples 36-46, and wherein selecting the first translated executable comprises selecting the first translated executable based on an expected runtime of the first translated executable.

Example 48 includes the subject matter of any of Examples 36-47, and wherein the means for selecting the first translated executable comprises means for selecting the first translated executable based on a power state of the computing device.

Example 49 includes the subject matter of any of Examples 36-48, and wherein the first hardware accelerator comprises a processor graphics of the computing device.

Example 50 includes the subject matter of any of Examples 36-49, and wherein the first hardware accelerator comprises an image signal processor of the computing device.

Example 51 includes the subject matter of any of Examples 36-50, and wherein the first hardware accelerator comprises a field-programmable gate array of the computing device.

The invention claimed is:

1. A computing device for dynamic code acceleration, the computing device comprising:
   a processor core to execute an application executable;
   a first hardware accelerator;
   a second hardware accelerator;
   an application profiler to identify an acceleration candidate in the application executable, wherein the application executable is targeted to an instruction set architecture of the processor core, and the acceleration candidate comprises a long-running computation of the application executable;
   a binary translator to (i) translate the acceleration candidate into a first translated executable, wherein the first translated executable is targeted to an instruction set architecture of the first hardware accelerator, and (ii) translate the acceleration candidate into a second translated executable, wherein the second translated executable is targeted to an instruction set architecture of the second hardware accelerator; and
   a runtime offload framework to: (i) determine whether to offload execution of the acceleration candidate in response to execution of the application executable by the processor core, (ii) select the first translated executable from the first translated executable and the second translated executable based on a dynamic state of the computing device in response to a determination to offload execution of the acceleration candidate, wherein the dynamic state of the computing device comprises one of: a dynamic workload of the computing device, a power state of the computing device, a size of input data associated with the acceleration candidate, or an expected run time of the first translated executable; and (iii) execute the first translated executable with the first hardware accelerator in response to selection of the first translated executable.

2. The computing device of claim 1, wherein:
the runtime offload framework is further to: (i) copy input data associated with the acceleration candidate to the hardware accelerator in response to the determination to offload execution of the acceleration candidate, wherein the input data comprises input data processed by the acceleration candidate, and (ii) copy output data associated with the first translated executable to the processor core in response to execution of the first translated executable, wherein the output data comprises output data generated by the first translated executable; and
to execute the first translated executable further comprises to execute the first translated executable in response to copying of the input data.

3. The computing device of claim 2, wherein:
to translate the acceleration candidate comprises to generate a prologue and an epilogue, wherein each of the prologue and the epilogue comprises an executable program;
to copy the input data associated with the acceleration candidate comprises to execute the prologue; and
to copy the output data associated with the first translated executable comprises to execute the epilogue.

4. The computing device of claim 3, wherein to execute the epilogue comprises to execute the epilogue by the processor core.

5. The computing device of claim 3, wherein to execute the epilogue comprises to execute the epilogue by the first hardware accelerator.

6. The computing device of claim 1, wherein the long-running computation comprises a significant portion of an execution time of the application executable.

7. The computing device of claim 1, wherein the first hardware accelerator comprises a processor graphics of the computing device.

8. The computing device of claim 1, wherein the first hardware accelerator comprises an image signal processor of the computing device.

9. The computing device of claim 1, wherein the first hardware accelerator comprises a field-programmable gate array of the computing device.

10. A method for dynamic code acceleration, the method comprising:
executing, by a computing device, an application executable with a processor core of the computing device, wherein the application executable is targeted to an instruction set architecture of the processor core;
identifying, by the computing device, an acceleration candidate in the application executable, wherein the acceleration candidate comprises a long-running computation of the application executable;
translating, by the computing device, the acceleration candidate into a first translated executable, wherein the first translated executable is targeted to an instruction set architecture of a first hardware accelerator of the computing device;
translating, by the computing device, the acceleration candidate into a second translated executable, wherein the second translated executable is targeted to an instruction set architecture of a second hardware accelerator of the computing device;
determining, by the computing device, whether to offload execution of the acceleration candidate in response to executing the application executable with the processor core;
selecting, by the computing device, the first translated executable from the first translated executable and the second translated executable based on a dynamic state of the computing device in response to determining to offload execution of the acceleration candidate, wherein the dynamic state of the computing device comprises one of: a dynamic workload of the computing device, a power state of the computing device, a size of input data associated with the acceleration candidate, or an expected run time of the first translated executable; and
executing, by the computing device, the first translated executable with the first hardware accelerator in response to selecting the first translated executable.

11. The method of claim 10, further comprising:
copying, by the computing device, input data associated with the acceleration candidate to the hardware accelerator in response to determining to offload execution of the acceleration candidate, wherein the input data comprises input data processed by the acceleration candidate; and
copying, by the computing device, output data associated with the first translated executable to the processor core in response to executing the first translated executable, wherein the output data comprises output data generated by the first translated executable;
wherein executing the first translated executable further comprises executing the first translated executable in response to copying the input data.

12. The method of claim 11, wherein:
translating the acceleration candidate comprises generating a prologue and an epilogue, wherein each of the prologue and the epilogue comprises an executable program;
copying the input data associated with the acceleration candidate comprises executing the prologue; and
copying the output data associated with the first translated executable comprises executing the epilogue.

13. The method of claim 10, wherein the long-running computation comprises a significant portion of an execution time of the application executable.

14. One or more non-transitory, computer-readable storage media comprising a plurality of instructions that in response to being executed cause a computing device to:
execute an application executable with a processor core of the computing device, wherein the application executable is targeted to an instruction set architecture of the processor core;
identify an acceleration candidate in the application executable, wherein the acceleration candidate comprises a long-running computation of the application executable;
translate the acceleration candidate into a first translated executable, wherein the first translated executable is targeted to an instruction set architecture of a first hardware accelerator of the computing device;
translate the acceleration candidate into a second translated executable, wherein the second translated executable is targeted to an instruction set architecture of a second hardware accelerator of the computing device;
determine whether to offload execution of the acceleration candidate based on a dynamic state of the computing device in response to executing the application executable with the processor core;

select the first translated executable from the first translated executable and the second translated executable based on a dynamic state of the computing device in response to determining to offload execution of the acceleration candidate, wherein the dynamic state of the computing device comprises one of: a dynamic workload of the computing device, a power state of the computing device, a size of input data associated with the acceleration candidate, or an expected run time of the first translated executable; and execute the first translated executable with the first hardware accelerator in response to selecting the first translated executable.

15. The one or more non-transitory, computer-readable storage media of claim 14, further comprising a plurality of instructions that in response to being executed cause the computing device to:

copy input data associated with the acceleration candidate to the hardware accelerator in response to determining to offload execution of the acceleration candidate, wherein the input data comprises input data processed by the acceleration candidate; and copy output data associated with the first translated executable to the processor core in response to executing the first translated executable, wherein the output data comprises output data generated by the first translated executable;

wherein to execute the first translated executable further comprises to execute the first translated executable in response to copying the input data.

16. The one or more non-transitory, computer-readable storage media of claim 15, wherein:

to translate the acceleration candidate comprises to generate a prologue and an epilogue, wherein each of the prologue and the epilogue comprises an executable program;

to copy the input data associated with the acceleration candidate comprises to execute the prologue; and to copy the output data associated with the first translated executable comprises to execute the epilogue.

17. The one or more non-transitory, computer-readable storage media of claim 14, wherein the long-running computation comprises a significant portion of an execution time of the application executable.

* * * * *